Jan. 2, 1940.  W. MARSHALL  2,185,816
TRIM FASTENER
Filed Nov. 8, 1937  2 Sheets-Sheet 1
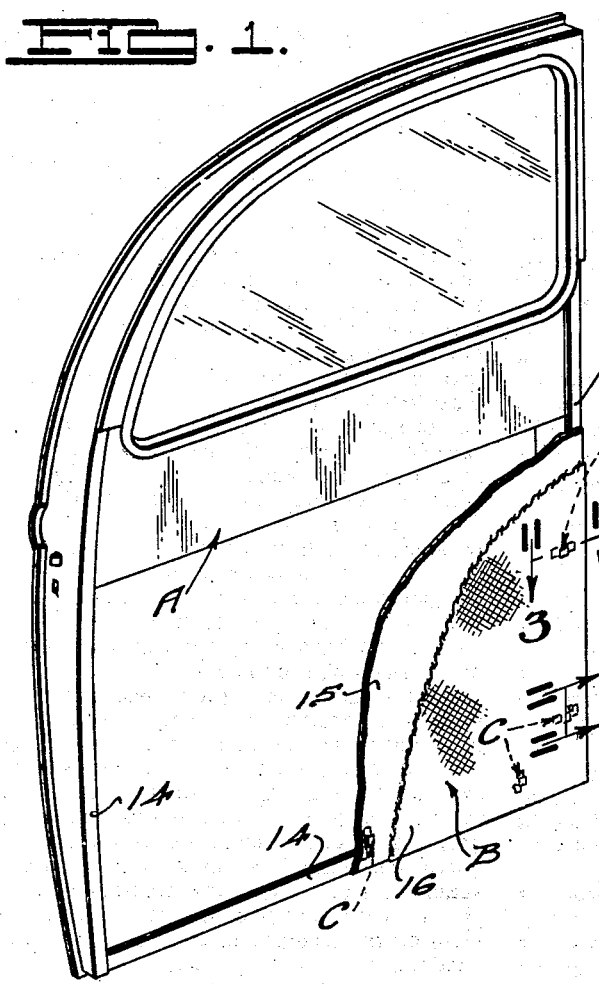
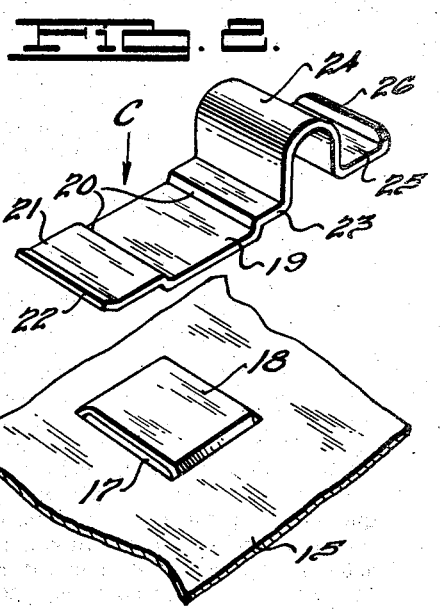
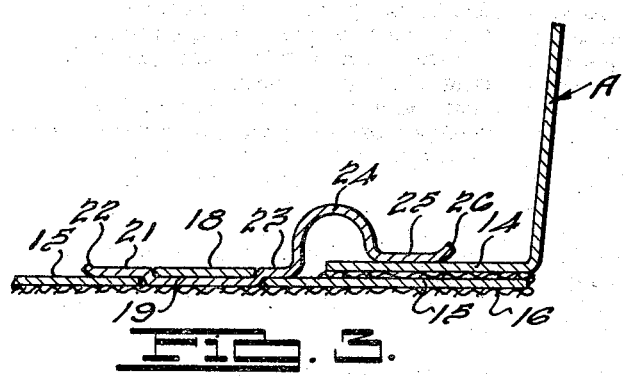
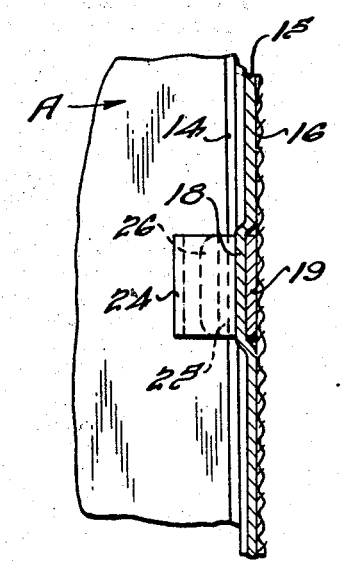
INVENTOR
William Marshall.
BY Dike, Calver & Gray
ATTORNEYS Jan. 2, 1940.  W. MARSHALL  2,185,816
TRIM FASTENER
Filed Nov. 8, 1937   2 Sheets-Sheet 2
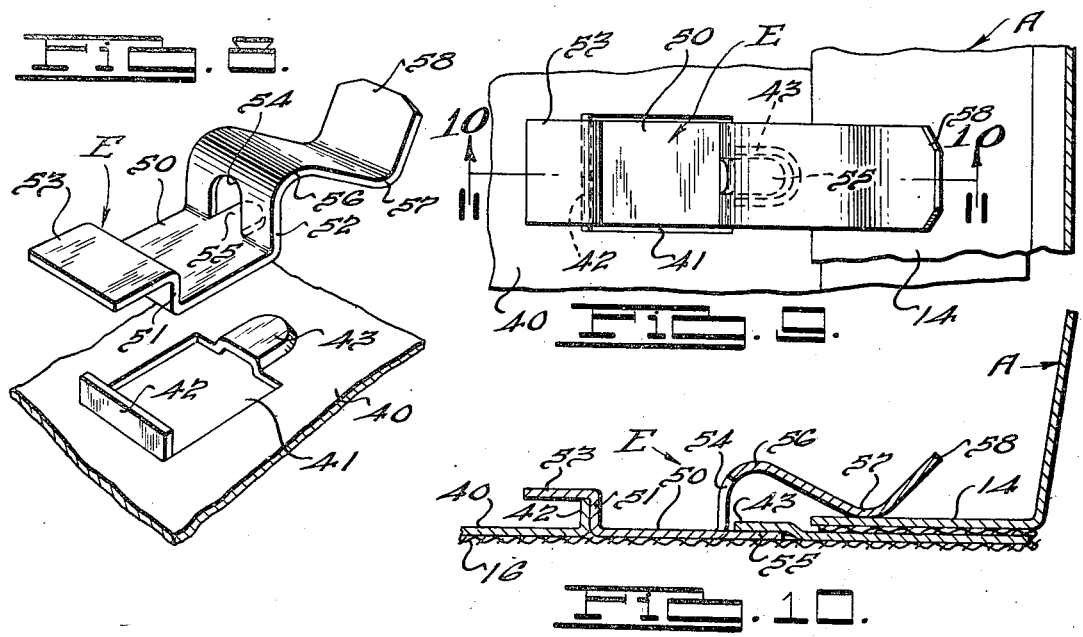
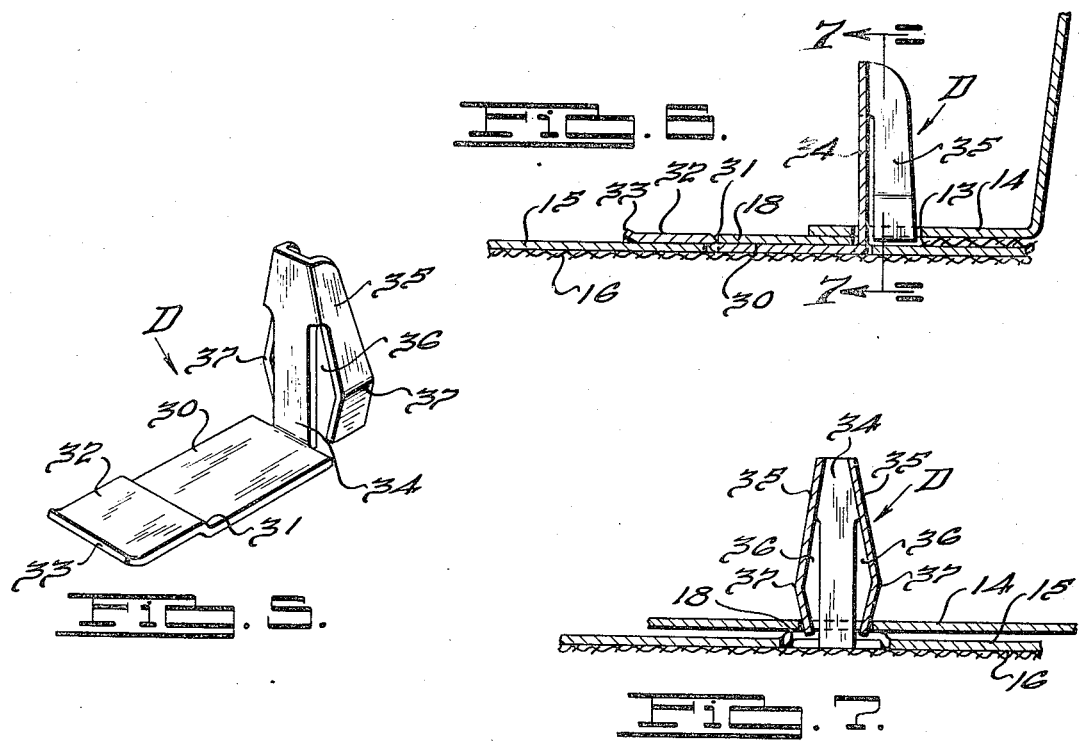
INVENTOR
William Marshall.
BY Dike, Calver & Gray
ATTORNEYS.

Patented Jan. 2, 1940

2,185,816

UNITED STATES PATENT OFFICE 2,185,816

TRIM FASTENER

William Marshall, Detroit, Mich., assignor to Briggs Manufacturing Company, Detroit, Mich., a corporation of Michigan Application November 8, 1937, Serial No. 173,345

18 Claims. (Cl. 24—73)

This invention relates to trim panels or trim panel assemblies particularly adapted for use in the interior trim finish of automobiles or other vehicle bodies and especially to fastener devices for trim panels.

An object of the invention is to provide a trim panel for a vehicle body with improved fastener means for removably attaching the panel to the vehicle door or other portion of the body framing with ease and facility.

A further object of the invention is to provide a new and improved interior trim panel, or trim panel assembly, together with a new and improved fastener device for detachably securing the panel to the body so that by virtue of the invention there is provided a fastener device of relatively simple construction which may be manufactured at low cost and assembled on the panel with a minimum of time and labor and enabling the provision of a trim panel which may be easily applied to the door or other framing of the vehicle body.

Another object of the invention is to provide an improved fastener device for a trim panel which may be cheaply and easily manufactured from a single piece or strip of metal and which may be assembled on the trim panel either before or after the application thereto of the trim material or fabric.

Another object of the invention is to provide an improved trim panel including a sheet metal backing or foundation sheet having socket means formed therein for receiving and releasably supporting fastener devices which may be snapped into place in the sockets and maintained in position upon the sheet against accidental displacement.

The above and other objects and advantages of the invention will appear in the following description and appended claims, when considered in connection with the accompanying drawings forming a part of this specification, wherein like reference characters designate corresponding parts in the several views.

In said drawings:

Fig. 1 is a perspective view, partly broken away, illustrating an automobile door having mounted therein a trim panel embodying the present invention.

Fig. 2 is a perspective view, on an enlarged scale, showing one form of fastener device embodying the invention and a fragment of the panel to which it is adapted to be attached.

Fig. 3 is an enlarged section taken substantially along the line 3—3 of Fig. 1, looking in the direction of the arrows.

Fig. 4 is an enlarged section taken substantially along the line 4—4 of Fig. 1.

Fig. 5 is an enlarged perspective view of a modified form of trim fastener embodying the invention.

Fig. 6 is an enlarged sectional view through the fastener of Fig. 5 and showing its application to a trim panel and support.

Fig. 7 is a section taken substantially along the line 7—7 of Fig. 6, looking in the direction of the arrows.

Fig. 8 is a view similar to Fig. 2 and showing a further modified form of fastener device and fragment of the panel to which it is applied.

Fig. 9 is a fragmentary top plan view illustrating the application of the fastener of Fig. 8 to a panel and support; and Fig. 10 is a section taken substantially along the line 10—10 of Fig. 9, looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to Fig. 1 of the drawings, there is illustrated therein, by way of example, a door A of an automobile body having mounted thereon, through the medium of fastener devices C, a trim panel B, the panel and fasteners being constructed in accordance with the present invention. It will be understood that the trim panels may be of different shapes and sizes and may be mounted at other localities on the inside of the body.

Referring now particularly to Figs. 1 to 4 inclusive, I have shown the trim panel B as comprising a backing or foundation sheet 15 formed of any suitable stiff material, such, for example, as metal. The panel includes also a sheet or covering of trim material or fabric 16 which is applied in conventional manner to the outer or exposed face of the panel. As seen in Figs. 2, 3 and 4, the panel has formed therethrough an opening or aperture 17 which, as shown, merely by way of example, is of rectangular shape, and is preferably formed by slitting the metal at spaced points after which it is struck up or pressed from the sheet to provide an offset strip or bridge strap portion 18 which spans the opening. It will be noted, see Fig. 3, that the strip or strap portion 18 is slightly narrower than the opening 17. Since the strip 18 is offset above the plane of the sheet 15 a slot or space is provided beneath it and between the strip and the adjacent face of the panel or sheet.

In accordance with the present embodiment of the invention the fastener device C has a relatively flat base which comprises an embossed portion 19 having upstanding spaced abutments or shoulders 20. The shoulders are extended outwardly to provide at one side of the embossment a flange 21 having an upwardly and outwardly flared lead end 22. At the opposite side of the embossment a flange 23 is provided and the metal is extended beyond the flange to provide a spring gripping portion including an inverted substantially U-shaped bow 24, a flat portion 25 and an upturned or flared lead portion 26. Normally the embossed portion 19 of the base and the flat portion 25, together with the flanges 21 and 23 extend in substantially parallel planes. The fastener C is applied to the foundation sheet by inserting the lead end 22 and flange 21 into one of the slots provided between the bridge piece 18 and the opening 17 and the fastener slid or snapped into place beneath the bridge piece until the embossed portion 19 thereof underlies said piece and the fastener is held in place by the engagement of the abutments or shoulders 20 with the side edges of the strip 18, see particularly Fig. 3. When the fastener is applied to the panel it lies substantially flat thereupon on the inner face thereof. It will be understood that the trim fabric 16 may be applied to the foundation sheet either prior to the application of the fastener thereto or after the fastener has been attached to the foundation sheet. By providing the fastener with the lead portion 22, it will be understood that it can be applied to the foundation sheet without disrupting the previously attached trim fabric 16. Any number of fasteners C may be applied to the foundation sheet adjacent two or more of its marginal edges so that the panel can be removably attached to the door A. As seen in Figs. 1, 3 and 4, the spring gripping portions 24, 25, 26 of the fastener engage the inner face of the door flange 14 and hold the panel securely in place upon the door.

Referring now particularly to Figs. 5, 6 and 7 of the drawings, I have shown a somewhat modified form of fastener embodying the present invention. In this form the fastener D comprises a relatively flat base or body portion 30 having a shoulder or abutment 31 at one end and extended to form a flange 32 provided with an upwardly and outwardly flared end or lead portion 33. At its opposite end the base or body portion 30 is extended or turned up at right angles to provide a central prong or gripping finger 34 having diametrically opposed forwardly bent spring flanges 35 which are secured to the body of the gripping member 34 adjacent the free end thereof but which are separated therefrom throughout the remainder of their height by slits 36 to permit expansion and contraction thereof. The flange members 35 are, as shown, wedge-like in formation, diverging outwardly from the entering end thereof to the bends 37 and thence extending in converging relation.

The free ends of the flange members terminate short of the plane of the base 30. The fastener D is applied to the foundation sheet 15 in a manner similar to the application of the fastener device C. The lead portion 33 and flange 32 are inserted through the slots at opposite sides of the bridge piece or strap 18 so that the base portion 30 will underlie and engage the bottom face of the strap, with the shoulder 31 in engagement with one end or side of the strip 18. Thus the fastener may be snapped into place upon the panel and remain thereupon against accidental displacement. The upstanding portion 34 of the fastener serves also as a stop or abutment engageable with the adjacent side or edge of the strap portion 18. The fastener of the present form is adapted to be applied to a door flange, such as the flange 14 by inserting the gripping finger and spring flanges 34 and 35 through a hole or opening 13 formed in the flange, see Fig. 6. It will be understood that any number of fasteners D may be applied to the panel and that the door flange is provided with a corresponding number of apertures 13 adapted to receive the fasteners to detachably secure the panel upon the support.

Referring now particularly to Figs. 8, 9 and 10, a somewhat further modified form of the invention is illustrated. In this form the fastener is shown as a whole at E and is adapted to be applied to the metal foundation sheet 40 of a trim panel. As shown, the foundation sheet is provided with an opening or aperture 41 having at one end an upstanding abutment or shoulder 42 formed from the metal of the panel. At the opposite end of the opening a part of the metal of the panel is preferably embossed to provide an upstanding socket portion or recess 43.

The fastener E of the present form is provided with a substantially flat base portion 50 having at opposite ends upstanding shoulders or abutments 51 and 52. The abutment 51 is extended outwardly to provide a flange 53 which extends in a plane substantially parallel to the plane of the base 50. The abutment 52 is notched out at 54 to provide a tongue or projecting portion 55 extending beyond the abutment and forming a continuation or extension of the base 50, the tongue being substantially in the plane of said base. The metal of the shoulder or abutment 52 is extended outwardly to provide a reversely bent spring gripping portion comprising a forwardly and downwardly extending part 56 which is flared upwardly to produce a curved gripping portion 57 and an upwardly inclined lead portion 58.

The fastener E is applied to the panel 40 by first inserting the tongue 55 into the socket 43 and then pressing the shoulder 51 downwardly against the adjacent face of the abutment 42 until the base portion 50 of the fastener is seated within the opening or aperture 41 with the flange 53 thereof overlapping the abutment 42 at one face of the panel 40 and with the tongue or projection 55 overlapping the panel at the opposite face thereof. When the panel is applied to a supporting surface A, it will be seen that the gripping portion 57 of the fastener engages the inner face of the flange 14 of the support. As the fastener E is pressed into place within the socket or opening 41 in the foundation sheet the parts are compressed or contracted. After the fastener has been lodged in its proper position, the normal expansion of the parts of the fastener serves to hold it in position against accidental displacement. It will be understood that the fastener E may be applied to the metal foundation sheet before or after the application to said sheet of the trim fabric or cover material 16.

I claim:

1. A fastener device for a metal trim panel having an opening formed therein, comprising a relatively flat base formed from a single strip of metal insertable in the panel opening and having an extension offset therefrom projecting beyond the base and extending in a plane above and parallel to the base to overlap an edge of the panel opening, a shoulder formed on the base and engageable with the opposite edge of the panel opening, and a part formed from the metal of the panel and overlapping a portion of the base.

2. A fastener device for a trim panel having an opening formed therein and a strap narrower than the opening formed from the material of the panel extending in a plane above and spanning the opening, comprising a relatively flat base insertable beneath the strap and extending across the opening transversely to the strap and overlapping the edges of said opening at opposite sides of said strap, and a spring fastener member extending from one end of the base.

3. A fastener device for a trim panel having an opening formed therein and a strap narrower than the opening formed from the material of the panel and spanning the opening, comprising a relatively flat base having an embossed portion to set into the opening beneath the strap, said embossment providing shoulders which abut the opposite edges of the strap whereby said strap and fastener base extend substantially flush at one side of the panel, and a spring fastener member extending from one end of the base.

4. A fastener device for a metal trim panel having an opening formed therein and a strap narrower than the opening formed from the material of the panel and spanning the opening, comprising a relatively flat base having an offset portion to set into the panel opening beneath the strap and fill the major portion of the area of said opening, said offset portion providing shoulders which abut the opposite edges of the strap, portions of said base overlapping opposite edges of the opening at opposite sides of said strap to hold the fastener in place on the panel, and a spring fastener member extending from one of said overlapping base portions.

5. A fastener device for a metal trim panel having an opening formed therein and a strap narrower than the opening formed from the material of the panel offset above and spanning the opening, comprising a relatively flat base having an offset portion insertable beneath and embracing the strap and extending across the opening transversely to the strap, said base having portions overlapping the edges of said opening at opposite sides of said strap, and a spring fastener member forming an extension of one of said overlapping portions.

6. A fastener device for a metal trim panel having an opening formed therein and a strap narrower than the opening formed from the material of the panel offset above and spanning the opening, comprising a relatively flat base having an offset portion insertable beneath and embracing the strap and extending across the opening transversely to the strap, said base having portions overlapping the edges of said opening at opposite sides of said strap, said base offset portion extending substantially flush with one face of said panel, said strap and the overlapping base portions extending substantially in the same plane at the other face of the panel, and a spring fastener member extending from one end of said base.

7. A fastener device for a metal trim panel having an opening formed therein and an upstanding abutment formed from the metal of the panel and defining one side of the opening, said panel having an embossed socket formed therein located at the opposite side of said opening, comprising a relatively flat base portion having shoulders at opposite ends thereof, a flange extended from one of said shoulders, a spring gripping member extended from the other of said shoulders, and a tongue projecting from said base portion in the same direction as said gripping member, said flange and said tongue being adapted to engage the abutment and socket when the base portion is inserted in the panel opening to maintain the fastener device in position upon the panel.

8. A fastener device for a metal trim panel having an aperture formed therein and an upstanding abutment defining one side of the aperture, said panel having an embossed socket formed therein and located at the opposite side of said aperture, comprising a relatively flat base portion insertable in the aperture and having longitudinally spaced upstanding shoulders extending from the base, a tongue formed from the metal of one of said shoulders and extending substantially in the plane of the base adapted to fit within the socket and overlap one edge of the panel aperture at one face of the panel, a flange extending from the other of said shoulders and offset from said base to engage said abutment and overlap the opposite edge of the panel aperture at the other face of the panel, and a spring gripping member extended from the base, said base forming substantially a rigid connection between said shoulders.

9. A fastener device for a metal trim panel having an opening formed therein and a metal strip spanning the opening and offset from the plane of the panel, comprising a relatively flat base portion insertable beneath the strip to be within the opening, said base portion having an end flange offset from the base and extending in a plane substantially parallel thereto, and a spring fastener member extending from the end of the base opposite to said flange.

10. A fastener device for a metal trim panel having an opening formed therein and a metal strip spanning the opening and offset from the plane of the panel, comprising a relatively flat base portion insertable beneath the strip to be within the opening, said base portion having an end flange offset from the base and extending in a plane substantially parallel thereto and overlapping an edge of the opening, and a spring fastener member extending from the end of the base opposite to said flange.

11. A fastener device for a metal trim panel having an opening formed therein and a metal strip spanning the opening and offset from the plane of the panel, comprising a relatively flat base portion insertable beneath the strip to substantially fill the opening, said base portion having an end flange offset from the base and extending in a plane substantially parallel thereto, a second flange offset from the end of the base opposite to the first flange and extending in substantially the plane of said first flange, and a spring gripping member projecting beyond said second flange in the general direction of the plane of the base portion.

12. A fastener device for a metal trim panel having an opening formed therein and a metal strip spanning the opening and offset from the plane of the panel, comprising a relatively flat base portion insertable beneath the strip to substantially fill the opening, said base portion having an end flange offset from the base and extending in a plane substantially parallel thereto, a second flange offset from the end of the base opposite to the first flange and extending in substantially the plane of said first flange, and a spring gripping member projecting beyond said second flange in the general direction of the plane of the base portion, said flanges providing spaced abutments engageable with the side edges of said metal strip to releasably maintain the fastener device in position upon the panel.

13. A fastener device for a metal trim panel having an opening and an offset strap portion formed from the metal thereof, comprising a relatively flat base portion insertable in the opening beneath the strap having an end flange offset from the base and extending in a plane substantially parallel to the plane of said base, a second flange offset from the opposite end of the base and extending substantially in the plane of the first flange, and a bowed spring gripping member extending beyond said second flange, said flanges providing abutments engageable with said strap portion to releasably maintain the fastener in position upon the panel.

14. A fastener device for a metal trim panel having an opening and an offset strap portion formed from the metal thereof, comprising a relatively flat base portion insertable in the opening beneath the strap having an end flange offset from the base and extending in a plane substantially parallel to the plane of said base, and a spring fastener member extended from the base at the end opposite to said flange.

15. A fastener device for a metal trim panel in which said panel is provided with an opening and an offset strap portion narrower than the opening formed from the metal of said panel, comprising a relatively flat base portion insertable in the opening beneath the strap having an end flange offset from the base and extending beyond and in a plane substantially parallel to the plane of said base, and a spring fastener member extended from the base at the end opposite to said flange, said flange and said fastener providing abutments engageable with said strap portion to prevent accidental displacement of said device from said panel when the parts are assembled.

16. A fastener device for a trim panel having an opening formed therein and a strap narrower than the opening formed from the material of the panel extending in a plane above and spanning the opening, comprising a relatively flat base insertable beneath the strap and extending across the opening transversely to the strap and overlapping an edge of said opening at one side of said strap, and an upstanding spring fastener member having spaced legs extending from one end of the fastener base.

17. A fastener device for a metal trim panel having an opening formed therein and a metal strip spanning the opening and offset from the plane of the panel, comprising a relatively flat base portion insertable beneath the strip to be within the opening, said base portion having an end flange offset from the base and extending in a plane substantially parallel thereto and overlapping an edge of the opening, and a spring fastener member extending perpendicularly from the end of the base opposite to said flange.

18. A fastener device for a metal trim panel having an opening and an offset strap portion formed from the metal thereof, comprising a relatively flat base portion insertable in the opening beneath the strap having an end flange offset from the base and extending in a plane substantially parallel to the plane of said base, and a spring fastener member extended from the base at the end opposite to said flange, said fastener member having spring flanges of wedge-like formation.

WILLIAM MARSHALL.